United States Patent
Chang et al.

(10) Patent No.: US 6,643,419 B2
(45) Date of Patent: Nov. 4, 2003

(54) ULTRA-HIGH SPEED, ACTIVE POLYMER-SILICA HYBRID, SINGLE CONTROL VOLTAGE MMI-BASED 1-BY-N PACKET SWITCH AND WG-BASED WDM PACKET ROUTER/TDM CONVERTER AND METHODS OF MAKING SAME

(75) Inventors: Daniel H. Chang, La Crescenta, CA (US); Talal Azfar, Los Angeles, CA (US); Harold R. Fetterman, Santa Monica, CA (US); Joseph Michael, Los Angeles, CA (US)

(73) Assignee: Pacific Wave Industries, Inc., Los Angeles, CA (US)

( * ) Notice: Subject to any disclaimer, the term of this patent is extended or adjusted under 35 U.S.C. 154(b) by 0 days.

(21) Appl. No.: 10/010,414

(22) Filed: Dec. 5, 2001

(65) Prior Publication Data

US 2003/0103710 A1 Jun. 5, 2003

(51) Int. Cl.[7] ................................................. G02B 6/26
(52) U.S. Cl. ........................... 385/14; 385/132; 385/8; 385/145; 385/126
(58) Field of Search ............................... 385/126, 14, 8, 385/132, 9, 1–4, 129–131, 141–145; 372/46, 50, 26, 96; 359/254, 261

(56) References Cited

U.S. PATENT DOCUMENTS 4,781,424 A * 11/1988 Kawachi et al. ............ 385/132
6,229,949 B1 * 5/2001 Ido et al. .................... 385/145
6,421,161 B1 * 7/2002 Rice ........................... 359/254

OTHER PUBLICATIONS

K. Kato and Y. Tohmori, "PLC hybrid integration technology and its application to photonic components,"IEEE Journal of Selected Topics in Quantum Electronics, vol 6, No. 1, Jan./Feb. 2000.

L. Ketelsen et al., "Electro–absorption modulated 1.55um wavelength selective DFB array using hybrid integration," Proceedings of OFC'99, 1999, paper PD4–1.

S. Garner et. al, "Three dimensional integrated optics using polymers," IEEE Journal of Quantum Electronics, vol. 35, No. 8, Aug. 1999.

(List continued on next page.)

*Primary Examiner*—Phan T. H. Palmer
(74) *Attorney, Agent, or Firm*—Benman, Brown & Williams

(57) ABSTRACT

A structure for effecting a transition from a passive waveguide to an active waveguide or from an active waveguide to a passive waveguide of the present invention. The inventive device comprises a first cladding; a first core disposed within the first cladding; and a ground plane disposed over the first cladding and the core. A second cladding is disposed on the ground plane. A second core is disposed on the second cladding. A third cladding is disposed on the second cladding and the second core and an electrode is disposed on top of the third cladding. The inventive structure enables the construction of a novel an advantageous switch comprising an input port; an output port; and plural waveguides disposed between the input port and the output port. Each waveguide includes a first cladding; a first core disposed within the first cladding; and a ground plane disposed over the first cladding and the core. A second cladding is disposed on the ground plane. A second core is disposed on the second cladding. A third cladding is disposed on the second cladding and the second core and an electrode is disposed on top of the third cladding. The inventive structure also enables a unique and advantageous router design comprising an active tuned arrayed waveguide grating and switching logic for controlling the grating.

14 Claims, 4 Drawing Sheets

OTHER PUBLICATIONS

N. Keil et al., "Thermal–optic vertical coupler switches using hybrid polymer/silica integration technology," Electronics Letters, vol. 36, No. 5, Mar. 2000.

Bachmann M., Besse P., Melchior H., "General self–imaging properties in NxN multimode interference couplers including phase relations." Applied Optics, vol 33, No. 18, pp 3905–3911, 1994.

Ferreras A. et. al., "Useful formulas for multimode interference power splitter/combiner design." IEEE Photonics Technology Letters, vol. 5, No. 10, pp 1224–1227, 1993.

Jenkins et. al., "Novel 1xN and NxN integrated optical switches using self–imaging multimode GaAs/AlGaAs waveguides." Applied Physics Letters, vol. 64, No. 6, pp 684–686, 1993.

Smit, M. and van Dam, C, PHASAR–Based WDM Devices:Principles, Design, and Applications. IEEE Journal of Selected Topics in Quantum Electronics, vol. 2, No. 2, pp236–250, 1996.

* cited by examiner

FIG. 1c
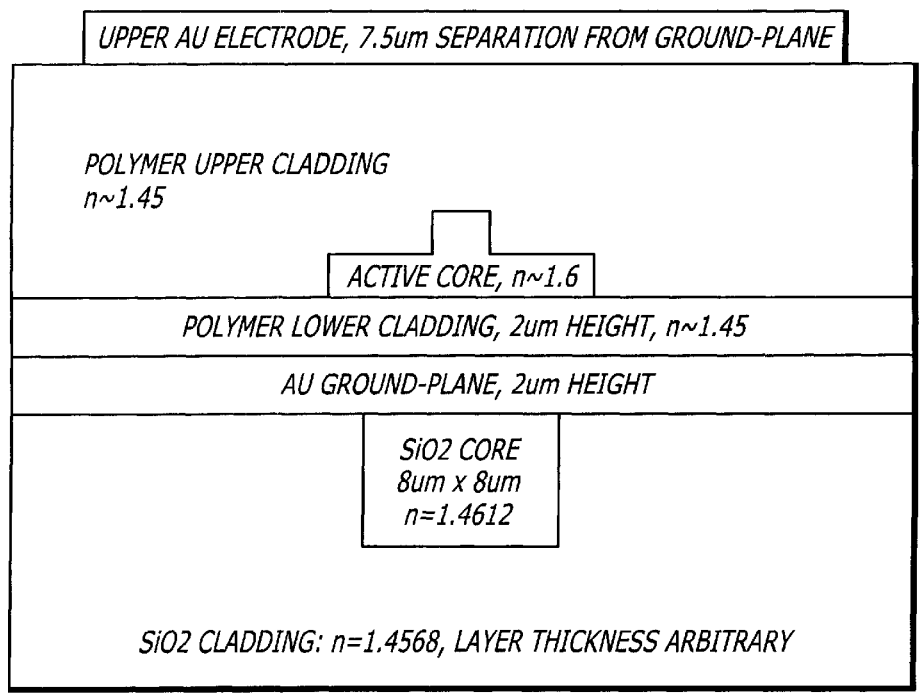
UPPER AU ELECTRODE, 7.5um SEPARATION FROM GROUND-PLANE
POLYMER UPPER CLADDING n~1.45
ACTIVE CORE, n~1.6
POLYMER LOWER CLADDING, 2um HEIGHT, n~1.45
AU GROUND-PLANE, 2um HEIGHT
SiO2 CORE
8um x 8um
n=1.4612
SiO2 CLADDING: n=1.4568, LAYER THICKNESS ARBITRARY
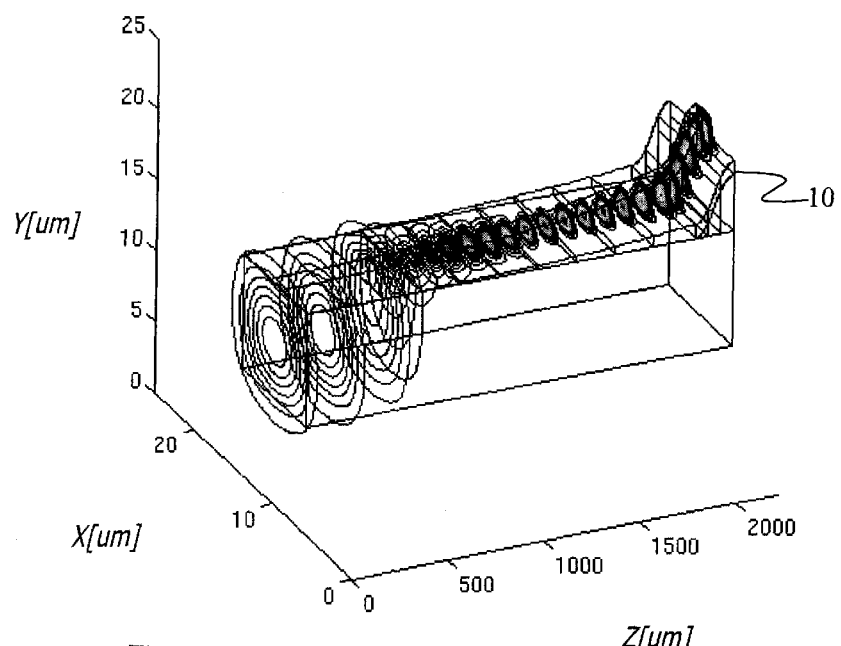
FIG. 2

ULTRA-HIGH SPEED, ACTIVE POLYMER-SILICA HYBRID, SINGLE CONTROL VOLTAGE MMI-BASED 1-BY-N PACKET SWITCH AND WG-BASED WDM PACKET ROUTER/TDM CONVERTER AND METHODS OF MAKING SAME

BACKGROUND OF THE INVENTION

1. Field of the Invention

The present invention relates to fiber optic devices used for communication and other applications. More specifically, the present invention relates to planar lightwave circuits.

2. Description of the Related Art

As is well-known in the art, many optical circuits use optical guides: planar lightwave circuits constructed with patterned silicon-dioxide layers on a silicon substrate.

Planar lightwave circuits (PLCs) made of low-loss silica promise to make significant impact as they reach commercial viability. Indeed, silica-based planar lightwave circuits—passive optical waveguide structures made using photolithographic techniques—comprise one of the most dynamic segments of the photonics field. Among their key virtues are extremely low propagation loss (0.01 dB/cm), excellent fiber coupling loss (0.1 dB for low index contrast waveguides), ease of defining complex structures such as Arrayed Waveguide Grating (AWGs) and Mach-Zehnder arrays using photolithographic fabrication processes, mode compatibility with optical fibers, and physical robustness. However, silica is a passive material with no electrically controlled phase shifting ability except for slow thermo-optic index modulation techniques.

In general, passive materials, previously used for routing and switching, offer low losses but suffer from low speeds and are not electrically responsive. Active materials, used for modulators and other devices, offer higher speeds but suffer from higher losses as well.

Consequently, a need exists in the art for a system and method for integrating low loss passive materials with active high speed electro-optic materials to make more sophisticated devices such as modulators, routers, and switches using fabrication processes compatible with both passive and active materials.

SUMMARY OF THE INVENTION

The need the art is addressed by the device for effecting a transition from a passive waveguide to an active waveguide or from an active waveguide to a passive waveguide of the present invention. The inventive device comprises a first cladding; a first core disposed within the first cladding; and a ground plane disposed over the first cladding and the core. A second cladding is disposed on the ground plane. A second core is disposed on the second cladding. A third cladding is disposed on the second cladding and the second core and an electrode is disposed on top of the third cladding.

The inventive device enables the construction of a novel and advantageous switch comprising an input port; an output port; and plural waveguides disposed between the input port and the output port. Each waveguide includes a first cladding; a first core disposed within the first cladding; and a ground plane disposed over the first cladding and the core. A second cladding is disposed on the ground plane. A second core is disposed on the second cladding. A third cladding is disposed on the second cladding and the second core and an electrode is disposed on top of the third cladding.

The inventive device also enables a unique and advantageous router design comprising an active tuned arrayed waveguide grating and switching logic, for controlling the grating. In the illustrative embodiment, the grating includes an input port; an output port; and plural waveguides disposed between the input port and the output port. Each waveguide includes a first cladding; a first core disposed within the first cladding; and a ground plane disposed over the first cladding and the core. A second cladding is disposed on the ground plane. A second core is disposed on the second cladding. A third cladding is disposed on the second cladding and the second core and an electrode is disposed on top of the third cladding.

BRIEF DESCRIPTION OF THE DRAWINGS

FIG. 1c shows the active section of the transition, which immediately follows the riser. The active section follows the transition structure, and is where electro-optic modulation takes place.

FIG. 2 superimposes electromagnetic simulation results onto the taper/riser transition, showing that the optical field is properly routed from the silica waveguide below to the active section, in proper position with respect to the modulation electrodes.

DESCRIPTION OF THE INVENTION

Figure 1A:
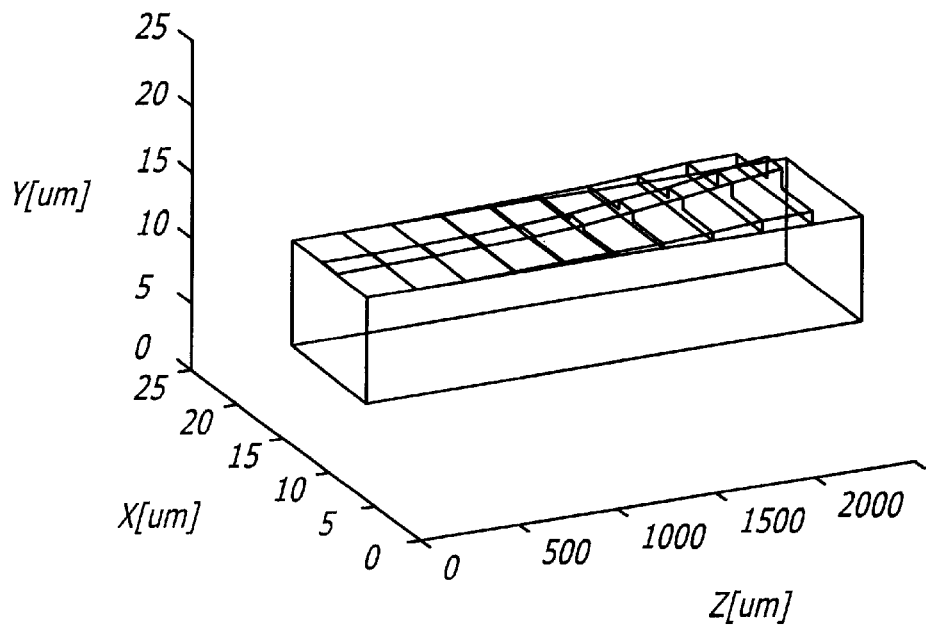
FIG. 1a–b are perspective views of the first two sections ("taper" and "riser" respectively) comprising the adiabatic transition structure constructed in accordance with the teachings of the present invention.

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

The present invention addresses the above-identified need in the art by providing a hybrid solution, with low loss silica routing signals to and from active sections which can provide wideband index modulation. Two leading conventional modulation mechanisms for telecommunication wavelengths, LiNbO3 and InP, are both poorly suited for hybrid integration with silica PLCs. LiNbO3 waveguides are formed by ion-diffusion, an intrinsically incompatible process. Greater success has been achieved with silica/InP integration. However, since the active sections suffer excessive index mismatch from silica, the strategies which have been pursued involve adiabatic spot size converters aiding butt-coupling. This requires simultaneous fabrication of both silica and InP sections, as well as simultaneous horizontal and vertical alignment, both of which are challenging.

On the other hand, an electro-optic polymer developed by Pacific Wave Industries holds considerable promise for successful integration. In addition to possessing properties which make it an excellent electro-optic material—high nonlinear effect, good optical/microwave velocity match, intrinsically fast response—processing steps for the polymer are conventionally photolithographic, and the refractive index is in a fortuitous range. The index difference between silica and the active polymer (1.45 vs. 1.6) is large enough that straightforward butt coupling is unlikely to work well. However, the index difference is such that the adiabatic coupling approach utilized in the present invention is effective.

The present teachings illustrate that a composite structure, where the higher index polymer lies next to the silica waveguide core, will exhibit a fundamental mode where almost all of the energy is confined in the polymer region. If a transition to such a region from a no-polymer region is made sufficiently slowly ("adiabatically") then energy should remain in the fundamental mode as the mode itself evolves. This is the physical basis for the operation of the claimed invention.

An adiabatic transition has another intrinsic advantage: the transition can be vertical. This implies that processing can be performed in disparate steps layer by layer, requiring almost no modification to existing silica waveguide fabrication steps. The invention then involves a fabrication of a complete silica planar lightwave circuit using conventional methods, then coating and etching polymer segments and electrodes on top where needed. In each step, alignment of only the horizontal dimension is required.

Thus, the present invention provides a high-performance silica to electro-optic polymer transition. The illustrative embodiment relates to Mach-Zehnder modulators, however the teachings provided herein may be utilized to fabricate many other devices, of increasing complexity, without departing from the scope of the present teachings.

Figure 1B:
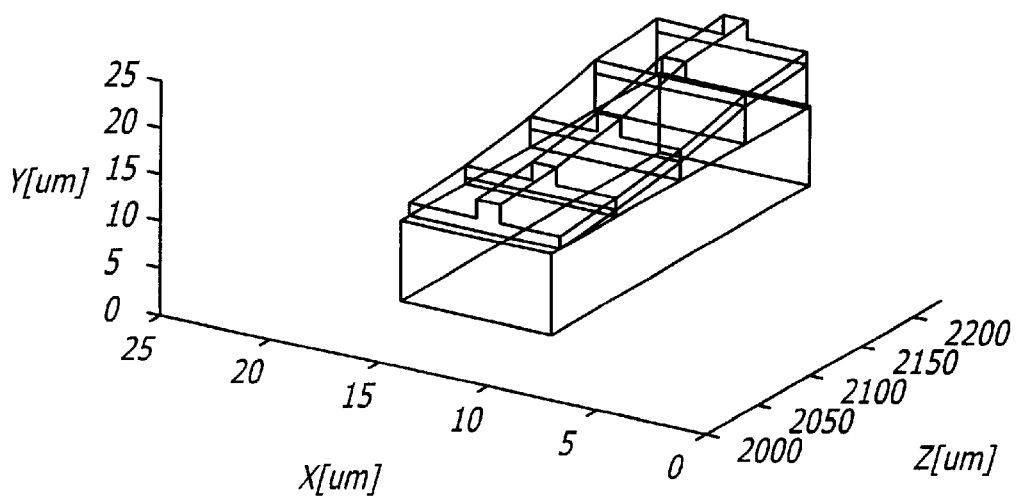

The structure of an adiabatic transition constructed in accordance with the teachings of the present invention is shown in FIGS. 1a—c. While the transition is a single continuous device, it is illustrative to consider it as being composed of three sections, here dubbed "taper," "riser," and "active section."

FIG. 1a shows the taper section, whose purpose is to gradually (adiabatically) "suck" the optical field being guided by the passive silica waveguide into the polymer deposited above. It is composed of (PWI name/patent reference here) polymer, photolithographically shaped to be a vertical exponential. Because the structure imposes a change in effective index from 1.45 to near 1.6, a long length is required. In the illustrative embodiment shown here, the taper is 2 mm long. In addition, the active polymer is in the form of a rib waveguide. Nonetheless, those of ordinary skill in the art will appreciate that other shapes and lengths may be utilized without departing from the scope of the present teachings.

FIG. 1b shows the riser section, whose purpose is to vertically displace the optical field, which by now is being guided by the polymer, so as to make room for the electrodes in the active section to follow. It is composed of the active core polymer sitting atop a passive lower cladding, composed of a suitable material such as UV-15. Because the riser merely turns the optical field without a large change in waveguide effective index, it is much shorter than the taper. In the illustrative embodiment shown here, the riser is 200 microns long. Both the bottom cladding and the active polymer layers of the riser are photolithographically defined to be a vertical S-curve.

FIG. 1c shows the active section, which differs from the riser section only in that electrodes are introduced. The ground plane—occupying the lower half of the bottom cladding section in the riser—and the top electrode together form a conventional microstrip. In the illustrative embodiment, the ground plane is a layer of gold or other suitable conductor of adequate thickness, i.e. 2 microns, and the top electrode is a layer of gold or other suitable conductor and is separated from the ground plane by 7.5 microns. These dimensions achieve a desirable microstrip impedance of 50 ohms, but those of ordinary skill in the art will appreciate that other dimensions may be utilized without departing from the scope of the present teachings.

It should be noted that, in the illustrative embodiment and any equivalent design, the modal confinement properties of the active polymer are such that almost no optical field intercepts the electrodes in the active section, allaying any concerns regarding optical loss due to conductive interaction with the electrodes. This is seen clearly in FIG. 2, which shows a scale drawing of the taper/riser structure, with a vectoral electromagnetic simulation of the optical field superimposed. At the input to the active section, which follows the riser, the optical field is properly positioned with respect to the electrodes, and highly confined in the active polymer.

Figure 3A:
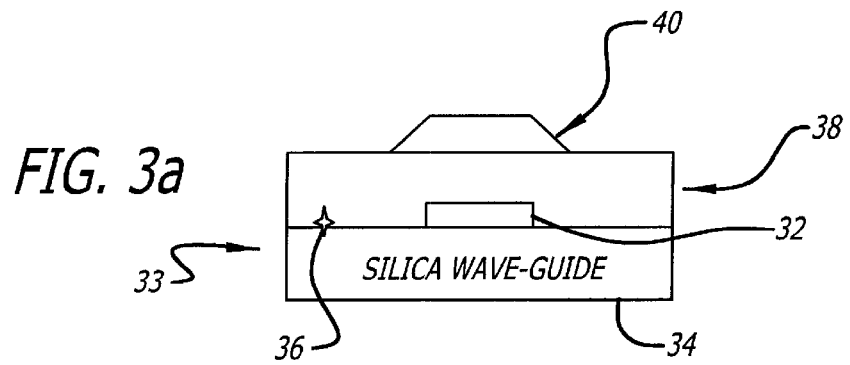
FIGS. 3a–c are diagrams which illustrate a 3-D structure and transition fabrication process implemented in accordance with the teachings of the present invention.
Figure 3B:
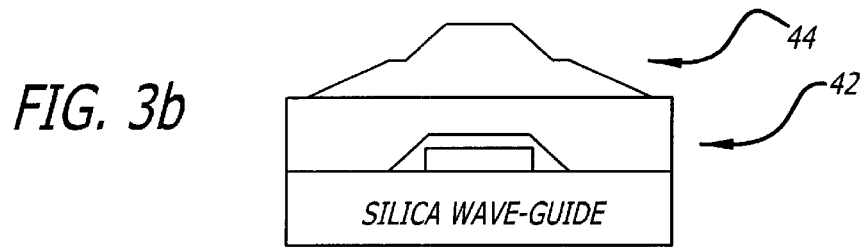
Figure 3C:
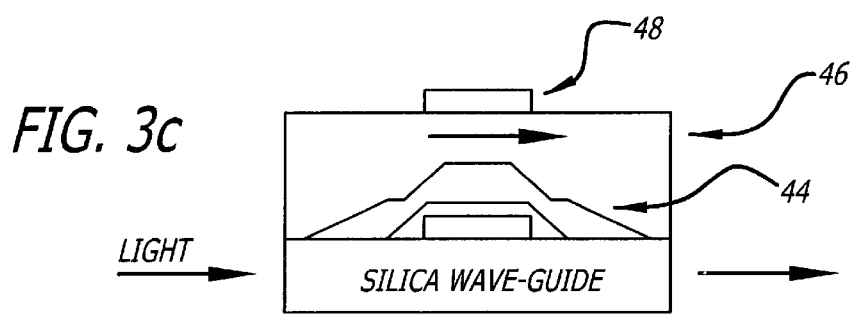

FIGS. 3a—c are diagrams which illustrate a 3-D structure and transition fabrication process implemented in accordance with the teachings of the present invention. For simplicity of the drawing, the transition sections are shown as linear height tapers rather than the exponential and S-curve structures shown above. These basic steps are required: deposition of the gold ground plane, coating/etching of the riser section, coating/etching of the active polymer taper, coating of the upper polymer cladding, and finally deposition of the upper electrode. Alignment between the silica waveguide wafer and the, polymer patterning masks is maintained with cooperative marks designed into the former.

Hence, as illustrated in FIG. 3a, the structure 3 is fabricated by depositing a conductive (e.g., gold) ground plane 32 on a silica waveguide 34. Note also that conductive alignment marks 36 may also be deposited on the silica waveguide 34.

Next, the lower cladding layer for the riser 38 is spun on over the ground plane 32 and silica waveguide 34. The lower cladding layer 38 may be UV-15 or other suitable optical material. Photoresist is then spun on, then grayscale-etched to transfer the S-curve pattern to the riser's lower cladding.

Next the same process is repeated for the active layer. A layer of the (active PWI polymer) is spun on, followed by photoresist, followed by grayscale-etch to transfer both the taper section's exponential and the riser section's S-curve profile to the active polymer.

In the illustrative embodiment, grayscale masks are used for the etching of the 3-D transition structures. High quality grayscale masks with the required resolution are now commercially available, making their use preferable to other methods such as shadow-masking.

ULTRA HIGH SPEED SINGLE CONTROL VOLTAGE 1×N INTEGRATED OPTICAL SWITCH

The inventive transition may be utilized in a variety of applications, e.g., high speed switching in photonic communications networks. A Multi-Mode Interferometer ("MMI") based switch architecture offers many advantages such as a generalized 1×N and N×N structure in a single device and good tolerance to fabrication errors. However, to push the switching speed up to the needed gigahertz (GHz) range, the N separate electrical signals required become increasingly cost-prohibitive. By taking advantage of certain symmetries in the well-known phase relationships in MMI's and utilizing the present teachings, a device may be constructed capable of switching an optical signal into N output ports using a single electrical control signal. (In addition, the unique ability to reverse the poling-induced electro-optic coefficient in active polymers manufactured and sold by Pacific Wave Industries may yield in a reduction by a factor of 2 in either the interaction length or the switching voltage required.)

Figure 4:
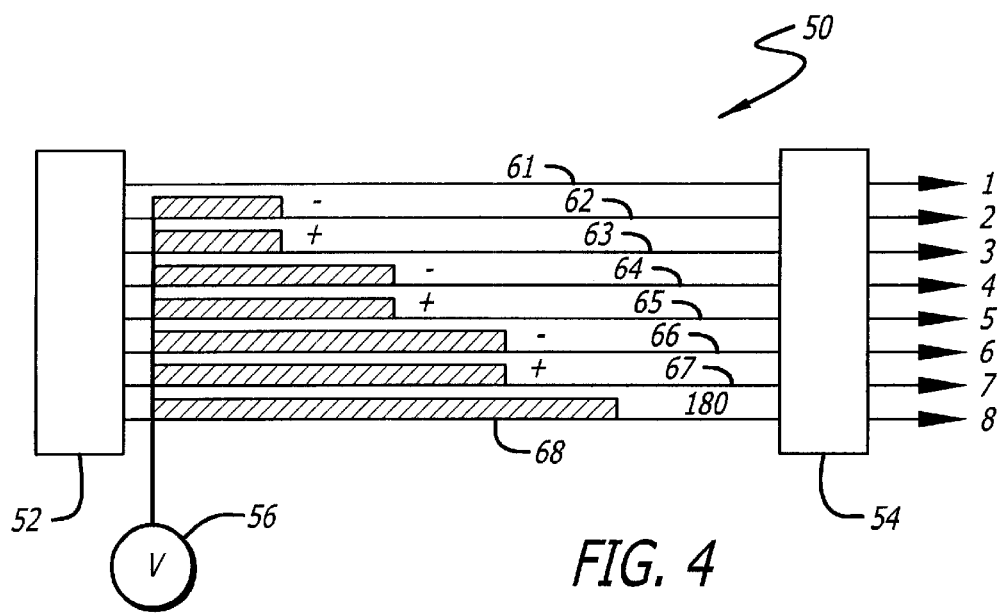
FIG. 4 is a schematic diagram showing an illustrative implementation of a switch architecture with N=8 in accordance with the teachings of the present invention.

FIG. 4 is a schematic diagram showing an illustrative implementation of a switch architecture with N=8 in accordance with the teachings of the present invention. As illustrated in FIG. 4, the switch 50 includes a 1×N MMI 52, an N×N MMI 54 and eight waveguides 61–68 disposed therebetween. Those skilled in the art will appreciate that the invention is not limited to 8 switched outputs. The teachings of the present invention may be extended to a number of waveguides required for a given application without departing from the scope thereof.

The MMI's and all other optical fan-out waveguides required to connect the claimed device to external optical fibers are constructed using silica-PLC technology, and each of the eight waveguides is fabricated as a hybrid structure 10 discussed above. The active sections of the hybrid structure perform the switching action. The electrodes of the eight waveguides 61–68 are driven by a source 56 such that the electrical waves are aligned in phase.

In accordance with the present teachings, the source 56 applies a voltage V such that an input is directed to an output port in accordance with a predetermined sequence. The voltage V is chosen such that the shortest electrode provides a desired phase shift θ, where θ=360/N=45 degrees where, as here, N=8. That is, applying nV, where n is 1 . . . N, will result in an input being directed to an output port 1–8. The output sequence is a function of N; in the case of N=8, the sequence is {5,3,1,2,4,6,8,7}. Those skilled in the art will recognize that the random-looking output sequence is in fact a consequence of the phase-relationships between input/outputs of MMI's. In addition, the order in which the sequence is traversed (in this example, 5-3-1-2-4-6-8-7 or 7-8-6-4-2-1-3-5) depends on the polarity of the applied switching field (that is, "+ on ground plane" or "– on ground plane").

The physical basis for the switching action in the claimed invention is the proper control of the relative phase shift which is imparted in the active section of each waveguide. The novelty of the invention lies in a parallel method of achieving these phase shifts, using special; relative lengths of the active sections in each waveguide. As mentioned above, this implementation is particularly well suited for high-speed operation. The prescription for the correct active section lengths is best described by the following "rules." These rules are stated in terms of the applied angular phase shift, which is the physically fundamental property. The translation from angular phase shift to physical length is an engineering design parameter, as discussed below.
1) Waveguide #1 never need not have an electrode on it.
2) Define Theta0=360/N in degrees.
3) If N is odd, there are a total of (N−1) electrodes with relative lengths so as to implement the phase shifts:

−Theta0
+Theta0
−2Theta0
+2Theta0
. . .
−((N−1)/2)Theta0
+((N−1)/2)Theta0

4) If N is even, there are a total of (N−1) electrodes with relative lengths so as to implement the phase shifts:

−Theta0
+Theta0
−2Theta0
+2Theta0
. . .
−((N−2)/2)Theta0
+((N−2)/2)Theta0
180 deg In a device whose active lengths are designed following these rules, the switching voltage logic is: application of a voltage, corresponding to n*Theta0 of phase shift on the shortest electrode, n=1. . . N, will switch the optical signal through the output ports in the special sequence which is a function of N, as described above.

Note that the appearance of +/−pairs permits the use of oppositely poled active polymer segments to achieve the required phase shifts with one length. This cuts the device length down by nearly a factor of 2 (e.g. can generate −30 rather than +330 degrees).

As mentioned above, each of the waveguides 61–68 has an active polymer section whose length is chosen as a compromise between minimizing loss (short active section) and minimizing switching voltage (long active section). Consider an illustrative embodiment where the longest active section length is 2 cm. The current state of the art in PWI's active polymer is such that a 2 cm active length results in a V-pi of 2v (those skilled in the art will recognize V-pi as the voltage necessary to induce a 180 degree optical phase shift.) Therefore such a device will require a maximum of about 16 volts to access all output ports for N=8.

ULTRA HIGH SPEED WDM PACKET ROUTER/ TDM CONVERTER

The Arrayed Waveguide Grating (AWG) has been extensively studied as an integrated optics device for demultiplexing WDM (Wavelength-Division Multiplexed) signals. The most common configuration is a static one, where an array of waveguides with specific lengths between two star-couplers, perform the equivalent function of a prism or grating, splitting multiple wavelengths in a single input waveguide into separate output waveguides. This permits AWGs to function as wavelength routers and Add-Drop Modules (ADM), crucial functions for WDM networks.

Active tuning of AWG's can be achieved by phase-shifting the waveguides in the array. Because coherence of the beams in the array must be maintained for proper localization of the fields at the output waveguides, each waveguide in the array should be phase-shifted by the same amount. The effect of this tuning is to shift the wavelength of the field localized at each output. AWG's tuned in this manner have been reported in the literature, mostly using the thermo-optic effect on silica or passive polymer devices.

The inventive device 10 achieves this tuning by depositing an adiabatic transition to and microstrip electrode atop each waveguide in the AWG. The electrodes are driven by a single microwave source. While the tuning mechanism resembles that of thermo-optically tuned AWG's, the fact that it is orders of magnitude faster permits interesting applications. Specifically, a fast tunable AWG can be used to route packets carried in multiple WDM channels to a single channel. If those packets comprise a single meaningful data stream, then the tuning speed corresponds to the packet transmission rate. If the packets comprise multiple meaningful data streams, then the device functions as a WDM-TDM converter, and the tuning speed translates directly to the time-slice on the output TDM channel. The basic requirement, fulfilled by the use of fast EO polymers in the inventive device, is that the device keep up with the packet rate in the input WDM channel.

Figure 5:
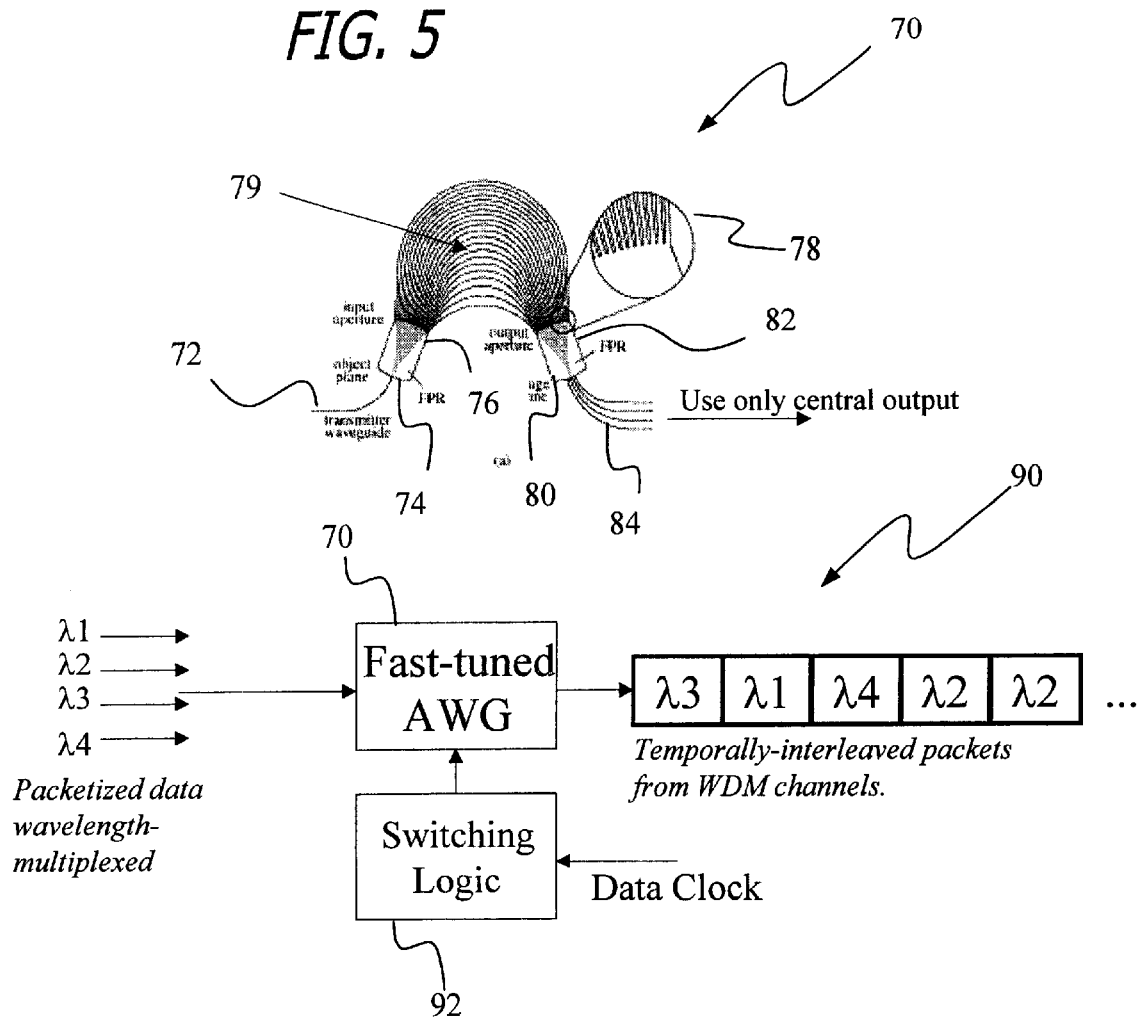
FIG. 5 is a block diagram showing an illustrative implementation of an ultra-high speed wavelength division multiplexed (WDM) packet router/time division multiplexed (TDM) converter in accordance with the teachings of the present invention.

FIG. 5 is a block diagram showing an illustrative implementation of an ultra-high speed wavelength division multiplexed (WDM) packet router/time division multiplexed (TDM) converter in accordance with the teachings of the present invention.

In accordance with present teachings, the hybrid AWG 70 is fed with packetized wavelength-multiplexed data and outputs a single optical channel with temporally-interleaved packets under control of switching logic 92. It is in this sense that the device converts from WDM to TDM.

The switching logic 92 generates a routing signal which is synchronized to the same data clock as the packets in the WDM stream. The routing signal tunes the AWG 70 to localize different wavelengths (channels) at the single output waveguide, in sync with the data clock. Essentially, it is a "fast steering prism." The switching logic (software) determines the actual packet sequence which is output; as such, it is application-dependent and plays no substantive role in the operation of the claimed invention.

Note that the optical signal in each output waveguide is composed of packets with different wavelengths. No frequency conversion is performed by the device—its basic function is to impose a set temporal order, synchronized with the external clock, to the wavelength variations in each output waveguide. Since the L and C-Band WDM channels fit comfortably within the response wavelength envelope of typical high-speed indium gallium-arsenide (InGaAs) photodetectors, the presence of multiple wavelengths in the output is not necessarily of concern. As long as chromatic dispersion is properly controlled (say with the use of DSF-fiber) or of no consequence (say in a short to medium length metro-network), the photodetector-receiver views the signal as a single stream of packets. In short, the system 90 imposes a temporal order which makes the packet stream time-division-multiplexed.

Finally, note that multiple devices may be used in parallel to generate multiple independent streams, limited only by the signal to noise ratio thereof.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

Accordingly,

What is claimed is:

1. A device for effecting a transition from a passive waveguide to an active waveguide or from an active waveguide to a passive waveguide comprising:

a first cladding;

a first core disposed within the first cladding;

a ground plane disposed over the first cladding and the core;

a second cladding disposed on the ground plane;

a second core disposed on the second cladding;

a third cladding disposed on the second cladding and the second core; and an electrode disposed on top of the third cladding.

2. The invention of claim 1 wherein the first cladding is fabricated with a passive material.

3. The invention of claim 2 wherein the first cladding is fabricated with silicon dioxide.

4. The invention of claim 3 wherein the first cladding has an index of refraction of 1.4568.

5. The invention of claim 4 wherein the first core is fabricated with silicon dioxide.

6. The invention of claim 5 wherein the first core has an index of refraction of 1.4612.

7. The invention of claim 1 wherein the second cladding is a polymer cladding.

8. The invention of claim 7 wherein the second cladding has an index of refraction of approximately 1.45.

9. The invention of claim 1 wherein the second core is an active core.

10. The invention of claim 9 wherein the active core has an index of refraction of approximately 1.6.

11. The invention of claim 1 wherein the third cladding is a polymer cladding.

12. The invention of claim 11 wherein the third cladding has an index of refraction of approximately 1.45.

13. The invention of claim 1 wherein the ground plane is gold.

14. The invention of claim 1 wherein the electrode is gold.

* * * * *